United States Patent [19]

McNeece

[11] 4,345,570
[45] Aug. 24, 1982

[54] FUEL HEATING APPARATUS FOR VEHICLES

[76] Inventor: Paul W. McNeece, P.O. Box 728, Ruston, La. 71270

[21] Appl. No.: 190,739

[22] Filed: Sep. 25, 1980

[51] Int. Cl.³ .......................................... F02M 31/00
[52] U.S. Cl. .................................. 123/557; 123/578; 123/525
[58] Field of Search .............. 123/557, 525, 527, 575, 123/578, 585, 587; 261/144, 145, 50A

[56] References Cited

U.S. PATENT DOCUMENTS

| | | | |
|---|---|---|---|
| 2,315,881 | 4/1943 | Thomas | 123/525 |
| 2,939,775 | 6/1960 | Middleton | 123/527 |
| 3,968,775 | 7/1976 | Harpman | 123/557 |
| 4,072,138 | 2/1978 | Hawkins | 123/557 |
| 4,196,710 | 4/1980 | Lehar | 123/557 |
| 4,233,945 | 11/1980 | Beitz | 123/557 |

Primary Examiner—Ronald H. Lazarus

[57] ABSTRACT

A fuel heating apparatus for carburetor-equipped vehicles which includes a vaporizer box provided with a fuel level control for maintaining a level of fuel therein, and having an air inlet and a fuel-air mixture outlet, and further fitted with a cold fuel inlet line and a cold fuel discharge line, a hot fuel inlet line and a heat exchanger for heating fuel recycled from the vaporizer box and subsequently recharged into the box, the apparatus further including a mixing chamber for receiving the fuel-air mixture discharged from the vaporizer box and more completely mixing the fuel and air prior to introducing the charge into the carburetor. The fuel heating apparatus is designed to improve the fuel efficiency of carburetor-equipped vehicle engines and to extend fuel mileage capabilities of the vehicles. The system can be quickly and easily adapted to substantially any carburetor-equipped vehicle currently on the market, and is particularly well suited to gasoline engine systems.

11 Claims, 4 Drawing Figures

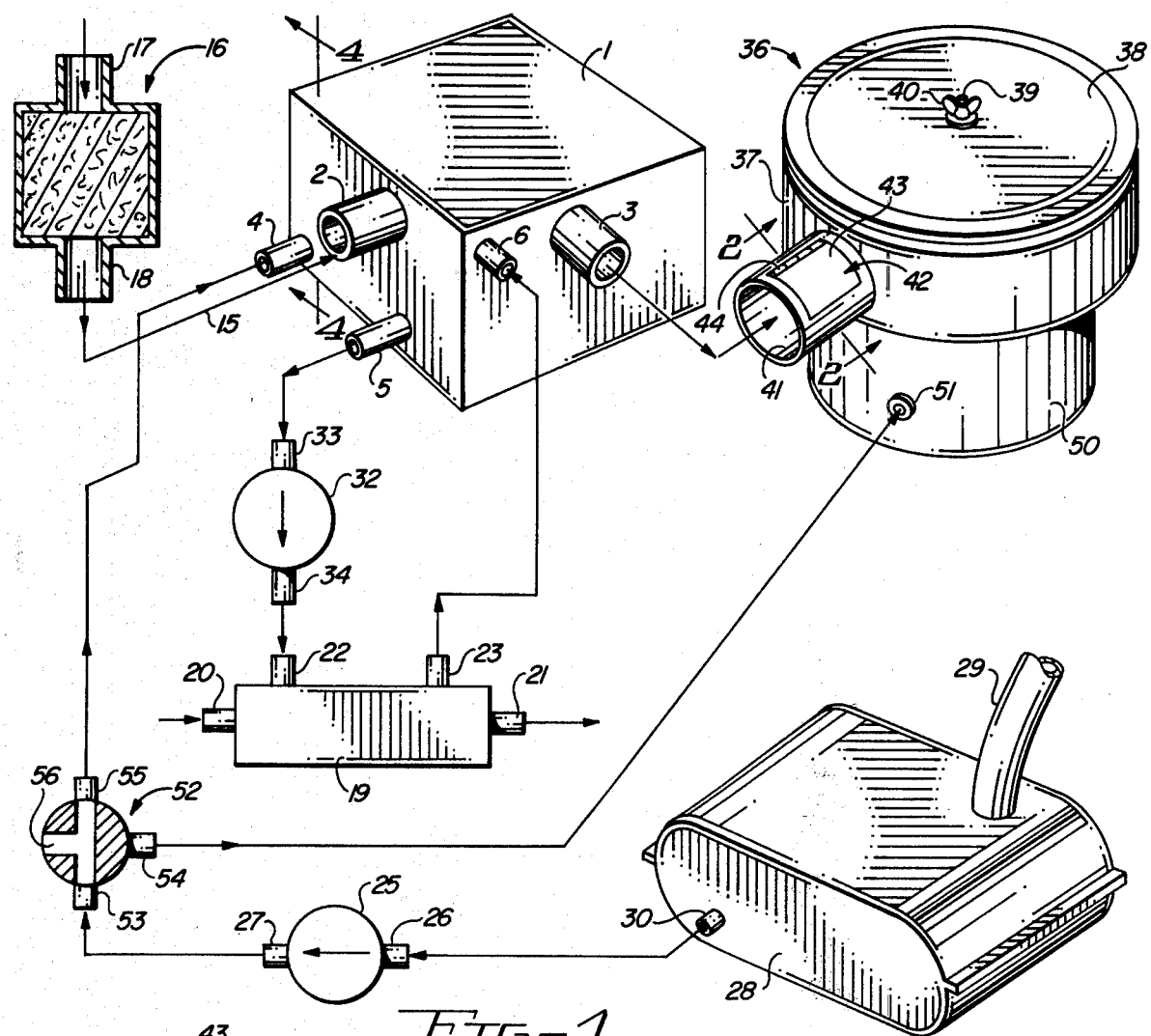
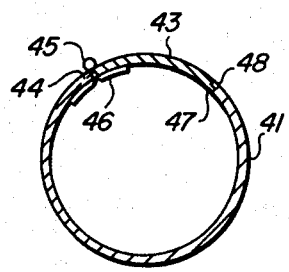
Fig-2
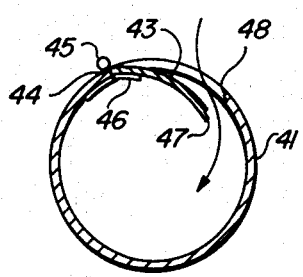
Fig-3
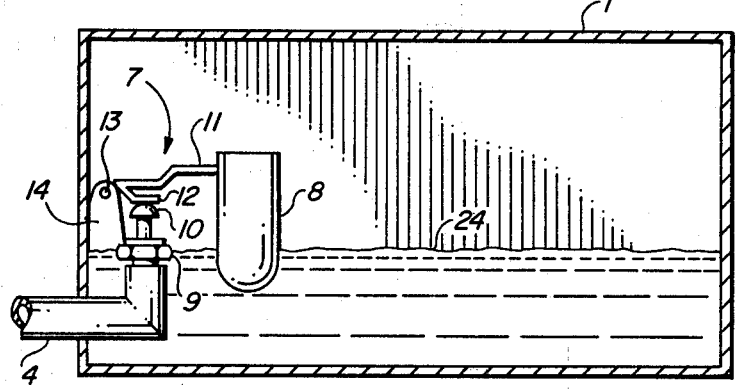
Fig-4

FUEL HEATING APPARATUS FOR VEHICLES

BACKGROUND OF THE INVENTION

1. Field of the Invention

This invention relates to energy conservation devices, and more particularly, to a fuel heating apparatus for carburetor-equipped vehicles which is designed to increase the engine fuel efficiency and to improve the gasoline or other fuel mileage of such vehicles by preheating the fuel according to a particularly desirable technique and feeding a heated fuel-air mixture directly to the vehicle carburetor at a higher temperature than conventional carburetor-feed temperatures. The fuel heating apparatus of this invention can be quickly and easily installed on substantially any carburetor-equipped automobile or vehicle currently on the market, and has been found to be capable of substantially increasing the mileage of gasoline-powered vehicles.

2. Description of the Prior Art

Many techniques have been utilized in the past for increasing the fuel efficiency of internal combustion engines, and gasoline engines utilizing carburetors, in particular. Typical of such devices is the simple heat exchanger, which makes use of circulating radiator water on the shell or tube side of the exchanger to heat gasoline on the opposite side in order to increase the temperature of the gasoline before it is either injected or introduced into the carburetor of a vehicle. It is a known fact that increasing the temperature of the fuel provided to the vehicle engine increases the combustion efficiency of the engine, and increases the fuel economy of the vehicle accordingly.

Among the prior art devices designed to preheat fuel prior to introducing the fuel into the engine is the Fuel Atomizing Unit disclosed in U.S. Pat. No. 4,020,812. This device is characterized by a heating element disposed in a conduit feeding to a combustion chamber and is designed to heat a fuel mist prior to introduction of the mist into the combustion chamber. Another such device is provided by John A. Templeton in U.S. Pat. No. 2,596,736, which heater raises the temperature of atomized fuel to thoroughly vaporize the fuel. Yet another heating mechanism for vaporizing fuel is the Float Chamber Means for a Carburetor disclosed in U.S. Pat. No. 4,207,277. This device is designed to fit in the float chamber of the vehicle carburetor and to heat the fuel contained in the float chamber to avoid percolation due to abnormal vaporization of fuel. Another fuel heater is disclosed in U.S. Pat. No. 4,141,327, and includes a ceramic resistor body mounted at the outlet of the air-fuel passage of the vehicle carburetor to heat the passing fuel-air mixture.

It is an object of this invention to provide a new and improved fuel heating apparatus for carburetor-equipped vehicles which is designed to raise the temperature of the incoming fuel by initially directing the fuel stream to a vaporizer box where a selected level of fuel is maintained, and subsequently heating a side stream of fuel from the vaporizer box and recycling it back into the box in a partially vaporized state for mixing with a stream of filtered air flowing through the box to the vehicle carburetor.

Another object of this invention is to provide a fuel heating apparatus for carburetor-equipped gasoline powered vehicles which includes a vaporizer box having an air inlet, a cold fuel inlet and level control means for maintaining a selected level of fuel in the box, and further provided with a recycle fuel outlet and an auxiliary fuel pump to facilitate discharge of the fuel from the box through a heat exchanger to raise the temperature of the fuel, and also having a hot fuel inlet for subsequently receiving the fuel back into the vaporizer box in a partially vaporized state for mixing with incoming air and charging the air-fuel mixture to a mixing chamber, and finally to the carburetor.

Yet another object of the invention is to provide a new and improved fuel heating apparatus for carburetor-equipped, gasoline-powered vehicles which includes a vaporizer box having air inlet and fuel-air discharge means, and further provided with a fuel inlet for receiving cool fuel from the vehicle storage tank into the vaporizer box, a fuel level control for maintaining a desired level of fuel in the vaporizer box, and heat exchanger means for heating the fuel and reintroducing it into the vaporizer box for mixing with the air stream and charging the fuel-air mixture into a mixing chamber for subsequent introduction into the vehicle carburetor.

Another object of this invention is to provide a fuel heating apparatus for increasing the fuel efficiency of vehicles equipped with carburetors which includes a primary, mechanically operated fuel pump, and valve means for pumping the liquid fuel initially into the vehicle carburetor, and subsequently to a vaporizer box fitted with a fuel level control for maintaining a selected level of fuel in the box; an electric auxiliary fuel pump for circulating the liquid fuel from the vaporizer box pool through a heat exchanger and back into the vaporizer box in a partially vaporized state for mixing with an air stream flowing through the box; and a mixing chamber for receiving the air and fuel, and further mixing it prior to introduction of the mixture into the vehicle carburetor.

A still further object of this invention is to provide a method for increasing the fuel efficiency of an internal combustion engine, and a carburetor-equipped gasoline engine in particular, by initially pumping liquid fuel to the carburetor in conventional fashion to warm the engine; subsequently directing the fuel to a vaporizer box having a fuel level control means to maintain a specified level of fuel therein; recycling the fuel from the vaporizer box through a heat exchanger to raise the temperature of the fuel, and injecting the partially vaporized fuel again into the box; moving a stream of air through the box and mixing the heated and vaporized fuel with the air; charging the heated air-fuel mixture into a mixing chamber for further mixing of the fuel and air; and continuously charging the fuel-air mixture to the carburetor for introduction into the engine.

SUMMARY OF THE INVENTION

A fuel heating apparatus for carburetor-equipped vehicles which includes a vaporizer box fitted with an air inlet and a fuel-air mixture discharge outlet, and further provided with a cold fuel inlet and a fluid level control means for maintaining a specified level of fuel in the box; a heat exchanger for receiving cool fuel from the vaporizer box, heating the fuel and subsequently recharging the heated, partially vaporized fuel into the box for mixing with air introduced into the vaporizer box through the air inlet; and a mixing chamber for receiving the air-fuel charge, further mixing the fuel and air, and charging the fuel to the vehicle carburetor. A method for increasing the fuel efficiency of internal combustion engines provided with carburetors and more particularly, carburetor-equipped gasoline powered engines, by initially directing gasoline to the vehicle carburetor in conventional manner to warm the engine and subsequently continuously introducing the gasoline into a vaporizer box and maintaining a level of gasoline in the box; recirculating the gasoline from the box through a heat exchanger to raise the temperature of the gasoline and recharging the heated, partially vaporized gasoline into the vaporizer box; mixing filtered air with the vaporized gasoline recharged into the vaporizer box; charging the resulting air-fuel mixture to a mixing chamber for further mixing of the air and gas vapor; and introducing the charge into the carburetor.

BRIEF DESCRIPTION OF THE DRAWING

The invention will be better understood by reference to the accompanying drawing, wherein:

FIG. 1 is a schematic and perspective diagram illustrating the fuel heating apparatus of this invention;

FIG. 2 is a sectional view of the fuel-air inlet, taken along lines 2—2 in FIG. 1, more particularly illustrating an air vent for introducing additional air into the system, which air vent is in the closed position.

FIG. 3 is a sectional view of the fuel-air inlet, more particularly illustrating the air vent in open position for allowing air into the fuel-air inlet; and FIG. 4 is a sectional view of the vaporizer box, taken along lines 4—4 in FIG. 1, more particularly illustrating a preferred technique for maintaining a liquid level of fuel in the vaporizer box.

DESCRIPTION OF THE PREFERRED EMBODIMENTS

Referring to FIGS. 1 and 4 of the drawing the fuel heating apparatus of this invention is characterized by a vaporizer box fitted with an air inlet 2 and a cooperating fuel-air discharge 3. Vaporizer box 1 is further provided with a cool fuel inlet 4, a cool fuel discharge 5, and a hot fuel inlet 6, the latter of which is positioned above the operating level of cool fuel inlet 4 and cool fuel discharge 5. As illustrated in FIG. 4 vaporizer box 1 is fitted with a fuel level control 7, provided in cooperation with cool fuel inlet 4 in order to maintain a selected level 24 of fuel inside the vaporizer box 1. In a preferred embodiment of the invention fuel level control 7 is a conventional carburetor float device and includes a float 8, carried by a float arm 11, which is pivotally attached to a fulcrum 14 by means of a float arm pin 13, as illustrated. The terminal end of cool fuel inlet 4 is provided with a needle valve 9 having a floating needle 10 in engagement with a needle flange 12, which extends beneath float arm 11. Accordingly, as the level 24 of fuel fluctuates inside vaporizer box 1, the flow of fuel into vaporizer box 1 through cool fuel inlet 4 is regulated by the rise and fall of float 8 of fuel level control 7 in conventional fashion.

Referring again to FIG. 1 of the drawing, a heat exchanger 19, having a fuel inlet 22, a fuel outlet 23, a water inlet 20, and a water outlet 21 is provided in cooperation with vaporizer box 1, and is designed to receive cool fuel pumped from vaporizer box 1 through cool fuel discharge 5 to fuel inlet 22 by means of auxiliary fuel pump 32, having an auxiliary fuel pump inlet 33 and an auxiliary fuel pump outlet 34, as illustrated. In a preferred embodiment of the invention auxiliary fuel pump 32 is electrically operated and fuel flowing into fuel inlet 22 of heat exchanger 19 is directed through coils (not illustrated) inside the heat exchanger and exits heat exchanger 19 through fuel outlet 23, where it is again introduced into vaporizer box 1 through hot fuel inlet 6 in a heated, partially vaporized state. Hot water is directed through the shell side of heat exchanger 19 into water inlet 20 and exits heat exchanger 19 through water outlet 21 to provide the heating medium for raising the temperature of the recycled fuel which is re-injected into vaporizer box 1. A filtered air stream 15 continuously flows into vaporizer box 1 through air inlet 2 and is cleaned by passage through an air filter 16, which filters outside air moving into air inlet 17 and out of air outlet 18. Accordingly, the air which moves through vaporizer box 1 from air inlet 2 mixes with the heated, vaporized fuel in vaporizer box 1 as it enters the vaporizer box through hot fuel inlet 6 at a point above cool fuel inlet 4 and cool fuel discharge 5. The resulting air-fuel mixture subsequently exits vaporizer box 1 through fuel air discharge 3, and is caused to flow through the fuel air inlet 41 of a mixing chamber 36. In another preferred embodiment of the invention mixing chamber 36 is simply the conventional vehicle air cleaner with the filter removed, and includes a round mixing chamber bowl 37 which is fitted with a removable mixing chamber plate 38. A plate bolt 39 extends from carburetor 50 through an aperture in the mixing chamber plate 38 and a wing nut 40 is designed to threadably secure mixing chamber plate 38 tightly onto mixing chamber bolt 37 to seal the mixing chamber bowl 37 in conventional fashion. Additional air can be introduced into the system upon demand through an air vent 42, which is provided in the fuel-air inlet 41 of mixing chamber 36. In yet another preferred embodiment, air vent 42 includes a curved air vent cap 43, which is attached to fuel-air inlet 41 by means of an air vent hinge 44, and generally conforms to the curvature of fuel-air inlet 41.

Referring now to FIGS. 2 and 3 of the drawing the air vent cap 43 is further provided with a cap spring pin 46, carried by hinge pin 45 of air vent hinge 44, and designed to apply pressure to the air vent cap 43 to keep it in a normally closed position, as illustrated in FIG. 2. When additional air is required by the system due to higher revolutions of the engine, the carburetor 50 operates at a higher vacuum and pulls additional quantities of air-fuel mixture into the carburetor throat from mixing chamber 36. When this vacuum in mixing chamber 36 reaches a predetermined level which is sufficient to cause air vent cap 43 to overcome the bias of cap spring pin 46, air vent cap 43 depresses on hinge pin 45 to the position illustrated in FIG. 3 to allow outside air to flow into mixing chamber 36. Accordingly, outside air is directed into fuel-air inlet 41 and mixing chamber 36 to provide a more "lean" mixture for higher revolutions of the engine, as desired. In yet another preferred embodiment of the invention the mating ends of air vent cap 43 and fuel-air inlet 41 are provided with a cap flange 47 and a fuel-air inlet flange 48, respectively, as illustrated in FIGS. 2 and 3. Furthermore, an air filter can be provided in cooperation with air vent 42, as deemed necessary.

Referring again to FIG. 1 of the drawing, fuel is provided to the fuel heating apparatus of this invention from a fuel tank 28, having a filler tube 29 and a fuel outlet nipple 30. A primary fuel pump 25, which is preferably mechanical in operation and is fitted with a conventional primary fuel pump inlet 26 and a primary fuel pump outlet 27 serves to pump fuel from fuel tank 28 to the valve inlet 53 of three-way valve 52, and from there alternatively, directly from first valve outlet 54, to carburetor 50 through carburetor fuel inlet 51, and from second valve outlet 55 to vaporizor box 1, through cool fuel inlet 4. This alternative flow of fuel from three-way valve 52 to carburetor 50 and vaporizor box 1 can be effected by either manual or automatic manipulation of the internal passages 56 of three-way valve 52, according to the knowledge of those skilled in the art.

In operation, the fuel heating apparatus of this invention is utilized as follows: Referring again to the drawing, the internal passages 56 of three-way valve 52 are initially set, either automatically or manually, to permit fuel to flow from fuel tank 28 through primary fuel pump 25 and first valve outlet 54 to carburetor fuel inlet 51 of carburetor 50. Accordingly, the engine is initially started in the conventional manner by supplying fuel directly to the carburetor. After the engine has warmed sufficiently to facilitate a smooth idle, the internal passages 56 of three-way valve 52 are again adjusted to permit fuel to flow from primary fuel pump 25 through second valve outlet 55, and into vaporizer box 1 through cool fuel inlet 4. A portion of the supply of fuel maintained in vaporizer box 1 at a specified level 24 by means of fuel level control 7 is then pumped from the vaporizor box through cool fuel discharge 5 by means of auxiliary fuel pump 32, through heat exchanger 19 and back into vaporizer box 1 through hot fuel inlet 6. In this regard, in a preferred embodiment of the invention a continuous flow of hot water is pumped from the radiator by means of the heater hoses through the shell side of heat exchanger 19, entering water inlet 20 and exiting water outlet 21, as illustrated. The hot fuel entering vaporizer box 1 through hot fuel inlet 6 is partially vaporized, and the vaporized portion is mixed with a flow of air which moves through air filter 16 into vaporizer box 1 by means of air inlet 2. A vacuum created by carburetor 50 due to operation of the engine also exists in the sealed mixing chamber 36, and causes the air-fuel mixture to flow from vaporizer box 1 through fuel-air discharge 3 and into mixing chamber bowl 37 through fuel-air inlet 41. The air-fuel mixture is more thoroughly mixed in mixing chamber 36 and is subsequently introduced into carburetor 50 from mixing chamber bowl 37. The engine is thus supplied with a fuel-air mixture containing fuel which has been pre-heated and vaporized, thereby increasing the fuel efficiency of the engine. As the engine is operated at higher revolutions, additional air is pulled into mixing chamber 36 through air vent 42 as heretofore described, in order to "lean" the air-fuel mixture entering carburetor 50. Accordingly, the size of fuel-air inlet 41, air vent 42 and the tension of cap spring pin 46 can be adjusted experimentally to allow appropriate volumes of air into mixing chamber 36 for selected engine speeds.

It will be understood by those skilled in the art that pre-operation of the engine in conventional fashion is necessary for two reasons. First, the engine needs to be conventionally warmed and operated to a point where the idle will be relatively smooth prior to introduction of the air-fuel mixture through the vaporizer box 1 and the mixing chamber 36 to insure a continued, smooth engine operation. Secondly, the water in the radiator must be heated sufficiently to exchange enough heat in heat exchanger 19 to preheat the fuel to a desired vaporization temperature as it is circulated from vaporizer box 1 through heat exchanger 19 and back into the vaporizer box.

It will be further appreciated that the fuel heating apparatus of this invention can be utilized on any carburetor-equipped vehicle regardless of the fuel blend used to power the engine. Accordingly, the system will increase the fuel efficiency of engines using regular, premium and unleaded grades of gasoline, as well as blends of these grades, and further including special blends of gasoline and alcohol, commonly known as "gasahol".

Having described my invention with the particularity set forth above, what is claimed is:

1. A fuel heating apparatus for a vehicle having a carburetor comprising:
  (a) a vaporizer box for mixing fuel and air and having an air inlet and a fuel-air mixture outlet, and a cool fuel inlet, a cool fuel discharge and a hot fuel inlet, and further including float means for maintaining a desired level of said fuel inside said vaporizer box;
  (b) heat exchange means in cooperation with said vaporizer box for receiving fuel from said vaporizer box through said cool fuel discharge, heating said fuel to vaporize at least a portion of said fuel, and discharging said fuel to said vaporizer box through said hot fuel inlet; and
  (c) a mixing chamber in cooperation with said vaporizer box and having a fuel-air inlet for receiving a mixture of said at least a portion of said fuel which is vaporized, and said air from said fuel-air outlet of said vaporizer box and further mixing said at least a portion of said fuel which is vaporized and said air and introducing said at least a portion of said fuel which is vaporized and said air as a vaporized fuel-air mixture into said carburetor of said vehicle.

2. The fuel heating apparatus of claim 1 further comprising an air filter in cooperation with said air inlet for filtering air introduced into said vaporizer box through said air inlet.

3. The fuel heating apparatus of claim 1 further comprising an air vent in cooperation with said fuel-air inlet of said mixing chamber, said air vent further comprising an air vent cap pivotally mounted in said fuel-air inlet and biased in normally closed position to facilitate downward pivoting and introduction of air into said fuel-air inlet responsive to a preselected decrease in fluid pressure in said mixing chamber.

4. The fuel heating apparatus of claim 1 further comprising:
  (a) an air filter in cooperation with said air inlet for filtering air introduced into said vaporizer box through said air inlet; and
  (b) an air vent in cooperation with said fuel-air inlet of said mixing chamber, said air vent further comprising an air vent cap pivotally mounted in said fuel air inlet and biased in normally closed position to facilitate downward pivoting and introduction of air into said fuel-air inlet responsive to a preselected decrease in fluid pressure in said mixing chamber.

5. The fuel heating apparatus of claim 1 further comprising valve means having a first outlet in cooperation with said cool fuel inlet of said vaporizer box, a second outlet in cooperation with the carburetor of said vehicle, and an inlet in cooperation with the primary fuel pump of said vehicle to control the flow of fuel pumped from said primary fuel pump alternatively to said vaporizer box and said carburetor.

6. The fuel heating apparatus of claim 1 further comprising:

(a) an air filter in cooperation with said air inlet for filtering air introduced into said vaporizer box through said air inlet;

(b) an air vent in cooperation with said fuel-air inlet of said mixing chamber, said air vent further comprising an air vent cap pivotally mounted in said fuel-air inlet and biased in normally closed position to facilitate downward pivoting and introduction of air into said fuel-air inlet responsive to a preselected decrease in fluid pressure in said mixing chamber; and (c) valve means having a first outlet in cooperation with said cool fuel inlet of said vaporizer box, a second outlet in cooperation with the carburetor of said vehicle, and an inlet in cooperation with the primary fuel pump of said vehicle to control the flow of fuel pumped from said primary fuel pump alternatively to said vaporizer box and said carburetor.

7. The fuel heating apparatus of claim 1 wherein said hot fuel inlet, said air inlet and said fuel-air outlet are provided in said vaporizer box at points above said cool fuel inlet and said cool fuel discharge and said heat exchange means is a heat exchanger having hot water connections and fuel attachments and an auxiliary fuel pump in cooperation with said fuel attachments and said cool fuel discharge for pumping fuel from said vaporizer box through said heat exchanger.

8. The fuel heating apparatus of claim 1 wherein said heat exchange means comprises a shell side and a tube side, and said fuel is introduced into said tube side and hot water is introduced into said shell side.

9. The fuel heating apparatus of claim 1 further comprising:

(a) an air filter in cooperation with said air inlet for filtering air introduced into said vaporizer box through said air inlet;

(b) an air vent in cooperation with said fuel-air inlet of said mixing chamber, said air vent further comprising an air vent cap pivotally mounted in said fuel-air inlet and biased in normally closed position to facilitate downward pivoting and introduction of air into said fuel-air inlet responsive to a preselected decrease in fluid pressure in said mixing chamber; and (c) valve means having a first outlet in cooperation with said cool fuel inlet of said vaporizer box, a second outlet in cooperation with the carburetor of said vehicle, and an inlet in cooperation with the primary fuel pump of said vehicle to control the flow of fuel pumped from said primary fuel pump alternatively to said vaporizer box and said carburetor; and wherein said hot fuel inlet, said air inlet and said fuel-air outlet are provided in said vaporizer box at points above said cool fuel inlet and said cool fuel discharge, and said heat exchange means is a heat exchanger having hot water connections and fuel attachments and an auxiliary fuel pump in cooperation with said fuel attachments and said cool fuel discharge for pumping fuel from said vaporizer box through said heat exchanger.

10. The fuel heating apparatus of claim 9 wherein said float means further comprises a float, a needle valve and a floating needle in said needle valve to maintain said desired level of said fuel in said vaporizer box.

11. A method for increasing the fuel efficiency of a carburetor-equipped engine by directing fuel into said carburetor to warm said engine; switching the flow of said fuel to a vaporizer box and maintaining a level of said fuel inside said vaporizer box; recirculating said fuel from said vaporizer box through a heat exchanger to raise the temperature of said fuel and vaporize a portion of said fuel; recharging said fuel into said vaporizer box; introducing air into said vaporizer box and mixing said air with said portion of said fuel which is vaporized; introducing said fuel which is vaporized and said air into a mixing chamber for further mixing of said air and said fuel which is vaporized; and introducing said air and said portion of said fuel which is vaporized into said carburetor.

* * * * *